United States Patent [19]
Ling et al.

[11] Patent Number: 5,718,111
[45] Date of Patent: Feb. 17, 1998

[54] FUZZY START LOGIC FOR JET ENGINES

[75] Inventors: Richard Ling, Scottsdale, Ariz.;
Ganesan Vaidyanathan, Flanders, N.J.

[73] Assignee: AlliedSignal Inc., Morris Township, N.J.

[21] Appl. No.: 569,055

[22] Filed: Dec. 8, 1995

Related U.S. Application Data

[60] Provisional application No. 60/001,931, Aug. 4, 1995.
[51] Int. Cl.$^6$ ............................................. F02C 9/28
[52] U.S. Cl. ................... 60/39.02; 60/39.141; 60/39.281
[58] Field of Search ............................. 60/39.02, 39.06, 60/39.141, 39.281

[56] References Cited

U.S. PATENT DOCUMENTS

| | | | |
|---|---|---|---|
| 3,902,315 | 9/1975 | Martin | 60/39.141 |
| 5,212,943 | 5/1993 | Harris | 60/39.141 |
| 5,524,599 | 6/1996 | Kong et al. | 123/682 |
| 5,547,337 | 8/1996 | Fork et al. | 415/1 |

*Primary Examiner*—Louis J. Casaregola
*Attorney, Agent, or Firm*—James W. McFarland

[57] ABSTRACT

A control apparatus and method for controlling the start-up of a turbine engine, including a compressor and a fuel control system, uses a sensor for sensing a first parameter associated with the start-up, generally the exit temperature of the turbine engine, along with a second sensor for sensing a second parameter associated with the start-up, generally the rate of change of speed of the compressor. These sensed parameters are compared with desired start-up characteristics to determine a first error and a second error. A first look-up table based on fuzzy logic is utilized to determine a first graded membership that is associated with the first error, while a second look-up table based on fuzzy logic is utilized for determining a second graded membership associated with the second error. A third look-up table based on fuzzy logic is utilized for determining an output compensation factor for the start-up based on the graded memberships. Based on the output compensation factor, the start-up of the turbine engine is adjusted, generally by adjusting fuel flow through use of a fuel control system.

5 Claims, 5 Drawing Sheets

FIG-1B

TABLES FOR GROUND START LOGIC

| N2 | T5_NOM | N2 DOT NOM | T5_MOD | N2 DOT_MOD |
|---|---|---|---|---|
| 2000 | 70 | 300 | 0.00 | 0.00 |
| 3000 | 290 | 300 | 0.00 | 0.00 |
| 3600 | 430 | 350 | 0.00 | 0.00 |
| 4000 | 680 | 400 | 0.00 | 0.00 |
| 4500 | 900 | 400 | 0.25 | 0.00 |
| 5000 | 1035 | 400 | 0.50 | 0.00 |
| 6000 | 1180 | 400 | 1.00 | 0.20 |
| 7000 | 1245 | 470 | 1.00 | 0.40 |
| 8000 | 1355 | 570 | 1.00 | 0.60 |
| 9000 | 1415 | 720 | 1.00 | 0.80 |
| 10000 | 1445 | 850 | 1.00 | 1.00 |
| 11000 | 1450 | 975 | 1.00 | 1.00 |
| 12000 | 1445 | 1095 | 1.00 | 1.00 |
| 13000 | 1425 | 1175 | 0.50 | 0.50 |
| 14000 | 1395 | 1240 | 0.00 | 0.00 |
| 16000 | 1300 | 1300 | 0.00 | 0.00 |

START X

| T5_MERR \ N2 DOT_MERR | -80 | -50 | -30 | -20 | -15 | -10 | -5 | 0 | 5 | 10 | 15 | 20 | 30 | 50 | 80 |
|---|---|---|---|---|---|---|---|---|---|---|---|---|---|---|---|
| -80 | 1.222 | 1.222 | 1.214 | 1.209 | 1.160 | 1.135 | 1.117 | 1.100 | 1.066 | 1.035 | 0.993 | 0.900 | 0.900 | 0.900 | 0.900 |
| -50 | 1.222 | 1.222 | 1.214 | 1.209 | 1.160 | 1.135 | 1.117 | 1.100 | 1.066 | 1.035 | 0.993 | 0.900 | 0.900 | 0.900 | 0.900 |
| -30 | 1.214 | 1.214 | 1.214 | 1.209 | 1.160 | 1.135 | 1.119 | 1.100 | 1.063 | 1.035 | 0.993 | 0.900 | 0.900 | 0.900 | 0.900 |
| -20 | 1.209 | 1.209 | 1.209 | 1.209 | 1.160 | 1.139 | 1.123 | 1.100 | 1.054 | 1.028 | 0.993 | 0.900 | 0.900 | 0.900 | 0.900 |
| -15 | 1.148 | 1.148 | 1.148 | 1.148 | 1.111 | 1.099 | 1.088 | 1.069 | 1.011 | 0.986 | 0.969 | 0.900 | 0.900 | 0.900 | 0.900 |
| -10 | 1.103 | 1.103 | 1.103 | 1.111 | 1.093 | 1.087 | 1.073 | 1.048 | 0.999 | 0.976 | 0.965 | 0.900 | 0.900 | 0.900 | 0.900 |
| -5 | 1.059 | 1.059 | 1.064 | 1.076 | 1.068 | 1.062 | 1.061 | 1.028 | 0.982 | 0.968 | 0.955 | 0.900 | 0.900 | 0.900 | 0.900 |
| 0 | 1.000 | 1.000 | 1.000 | 1.000 | 1.000 | 1.000 | 1.000 | 1.000 | 0.972 | 0.952 | 0.931 | 0.900 | 0.900 | 0.900 | 0.900 |
| 5 | 0.972 | 0.972 | 0.969 | 0.963 | 0.956 | 0.960 | 0.960 | 0.972 | 0.926 | 0.916 | 0.902 | 0.877 | 0.881 | 0.883 | 0.883 |
| 10 | 0.952 | 0.952 | 0.952 | 0.948 | 0.940 | 0.944 | 0.947 | 0.952 | 0.916 | 0.899 | 0.888 | 0.861 | 0.865 | 0.865 | 0.865 |
| 15 | 0.931 | 0.931 | 0.931 | 0.931 | 0.932 | 0.932 | 0.931 | 0.931 | 0.902 | 0.888 | 0.878 | 0.840 | 0.840 | 0.840 | 0.840 |
| 20 | 0.900 | 0.900 | 0.900 | 0.900 | 0.900 | 0.900 | 0.900 | 0.900 | 0.877 | 0.861 | 0.840 | 0.791 | 0.791 | 0.791 | 0.791 |
| 30 | 0.900 | 0.900 | 0.900 | 0.900 | 0.900 | 0.900 | 0.900 | 0.900 | 0.881 | 0.865 | 0.840 | 0.791 | 0.786 | 0.786 | 0.786 |
| 50 | 0.900 | 0.900 | 0.900 | 0.900 | 0.900 | 0.900 | 0.900 | 0.900 | 0.883 | 0.865 | 0.840 | 0.791 | 0.786 | 0.778 | 0.778 |
| 80 | 0.900 | 0.900 | 0.900 | 0.900 | 0.900 | 0.900 | 0.900 | 0.900 | 0.883 | 0.865 | 0.840 | 0.791 | 0.786 | 0.778 | 0.778 |

FIG. 2

FUZZY START LOGIC FOR JET ENGINES

This is a continuation of provisional application Ser. No. 60/001,931 filed Aug. 4, 1995.

FIELD OF THE INVENTION

The present invention relates in general to gas turbine engine fuel control systems, and more particularly, to an improved start-up control system and method utilizing fuzzy logic for gas turbine engines utilized in aircraft.

BACKGROUND OF THE INVENTION

Gas turbine engines experience inconsistent turbine exit temperatures and start times during ground start due to sensory inaccuracies and various control variations from engine to engine. This is primarily due to the fact that some of the control components and sensors within the engine are typically designed for accuracy at the high ends of their operating ranges. However, for engine start-up, both control components and sensors operate at the low ends of their operating ranges, resulting in poor accuracy and consistency.

One sensed characteristic of engine operation is the pressure associated with a compressor within the engine. Typically, during normal maximum power operation, the operating pressure can reach 400 psi. However, during start-up on the ground, the pressure is generally around atmospheric and accordingly, the accuracy at this low end is not very good because a variation of one or two psi represents a large percentage relative to atmospheric pressure, while a variation of two psi at 400 psi represents only one-half of a percent. This poor accuracy in pressure sensing leads to inaccurate fuel flow scheduling because compressor pressure is an essential parameter for scheduling fuel flow command. Furthermore, fuel control delivery accuracy at the low flow flow region where engine start takes place is also very poor and inconsistent. As a combined result of fuel scheduling and delivery inaccuracies, turbine exit temperature and start time can vary a great deal from engine to engine. If an engine persistently exhibits a much higher than normal turbine exit temperature due to these inaccuracies during every engine start, over a period of time the life span of the turbine blades can be reduced significantly. If an engine exhibits a much longer than normal start time, the pilot may abort a mission because he believes there is something seriously wrong with the engine, even though the engine is totally capable of operating normally at a high power level after the engine start.

One option is to develop a more complex fuel control system that can provide a more accurate fuel flow during the start-up, and/or to use a more accurate pressure sensor. However, these are not very good alternatives because they greatly increase the cost of the engine while only improving performance during a minute portion of engine operation.

Another alternative that has been attempted in the past is to develop a closed loop control system that controls the rate of change of speed by varying the fuel flow to achieve a certain acceleration during the start. This is commonly called NDOT Control. This is a very common method used by the prior art in the field, but still does not result in achieving the type of consistent temperature profile that is desired. For such a control system, one generally utilizes conventional control system development methods, and therefore, typically needs a very good model of the system to be controlled in order to design the control system. Unfortunately, it is very difficult to obtain an accurate model representing the start-up of a turbine engine. The turbine engine consumes a fuel-air mixture that is created by supplying fuel and compressed air to a combustor where it is combusted. At the very low speed region during start-up, the dynamic characteristics necessary for an accurate and useful model are very difficult to characterize for numerous reasons. Unstable combustion and very low air flow are two such reasons. Accordingly, the fuel-air mixture supplied to the turbine engine is not fully developed in the start-up region and it essentially is very difficult to develop a good model that is consistent. The classical method of designing a control system requires a good, consistent model on which to base the control system in order to define the space state model. Basically, in order to develop such a model, one needs a large amount of experimental data to develop an empirical model. This is very expensive and also time consuming and still, because of the inaccuracies and inconsistency of the sensors and fuel delivery devices in the start-up region, will not lead to development of a good model and thereby a good control system. Even after obtaining the empirical model, the task of designing the conventional control algorithm remains very difficult because the model typically is highly non-linear. As a result, it usually requires a large amount of trial and error to optimize the conventional control algorithm.

Accordingly, a control system is needed that overcomes the shortcomings of the prior art by providing a consistent start time at desirable temperature profiles despite sensor inaccuracy, variable fuel flow conditions and start torque variations.

SUMMARY OF THE INVENTION

A control system and method utilizing fuzzy logic according to the present invention addresses the shortcomings of the prior art.

In accordance with one aspect of the present invention, a control apparatus for controlling the start-up of a turbine engine, including a compressor, comprises a sensor for sensing a first parameter associated with the start-up, generally the exit temperature of the turbine engine, along with a second sensor for sensing a second parameter associated with the start-up, generally the rate of change of speed of the compressor. These sensed parameters are compared with desired start-up characteristics to determine a first error and a second error. A first look-up table based on fuzzy logic is utilized to determine a first graded membership that is associated with the first error, while a second look-up table based on fuzzy logic is utilized for determining a second graded membership associated with the second error. A third look-up table based on fuzzy logic is utilized for determining an output compensation factor for the start-up based on the graded memberships. Based on the output compensation factor, the start-up of the turbine engine is adjusted, generally by adjusting fuel flow through use of a fuel control system.

BRIEF DESCRIPTION OF THE DRAWING FIGURES

The present invention will hereinafter be described in conjunction with the appended drawing figures, wherein like designations denote like elements, and:

FIG. 2 illustrates the ground start fuzzy logic look-up tables' contents;

DETAILED DESCRIPTION OF THE PREFERRED EMBODIMENT

Figure 1A:
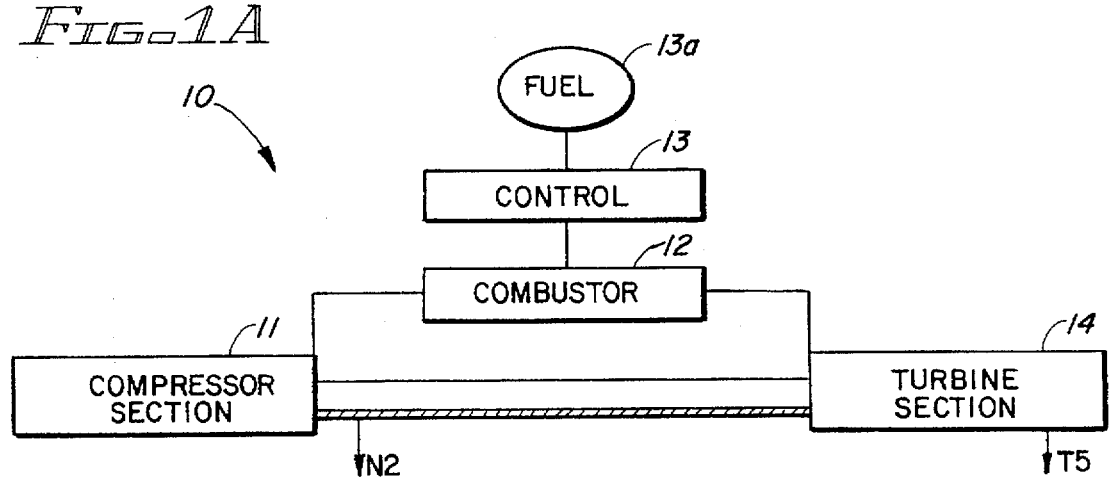
FIG. 1A is a schematic diagram of a gas turbine engine.

FIG. 1A schematically illustrates a gas turbine engine system 10 that includes an air compressor section 11 for delivering high pressure air to a combustor 12. An example of a turbine engine 10 for use with the present invention includes a combustor 12 which receives fuel via a fuel control 13 to maintain a continuous combustion process therein. Fuel is supplied from fuel supply 13a. An example of a processor for use with fuel control 13 is the Intel 80186, which is produced by Intel Corporation.

Hot gases are exhausted from combustor 12 across a turbine section 14 to generate power. Some of the generated power is used to drive compressor section 11 through one or more spools (not shown). Sensors (not shown) are provided to sense turbine temperature T5 at a desired stage in the turbine section 14. Additional sensors are utilized to sense engine speed, which usually corresponds to the speed N2 of compressor 11. Typically, production engines experience significant variations in T5 during ground start due to compressor pressure and fuel control variations from engine to engine. It is highly desirable to provide a more consistent temperature T5 rise profile during ground start despite the pressure and/or fuel control variations, without resorting to more expensive pressure sensors, as well as a more costly fuel control system.

Figure 1B:
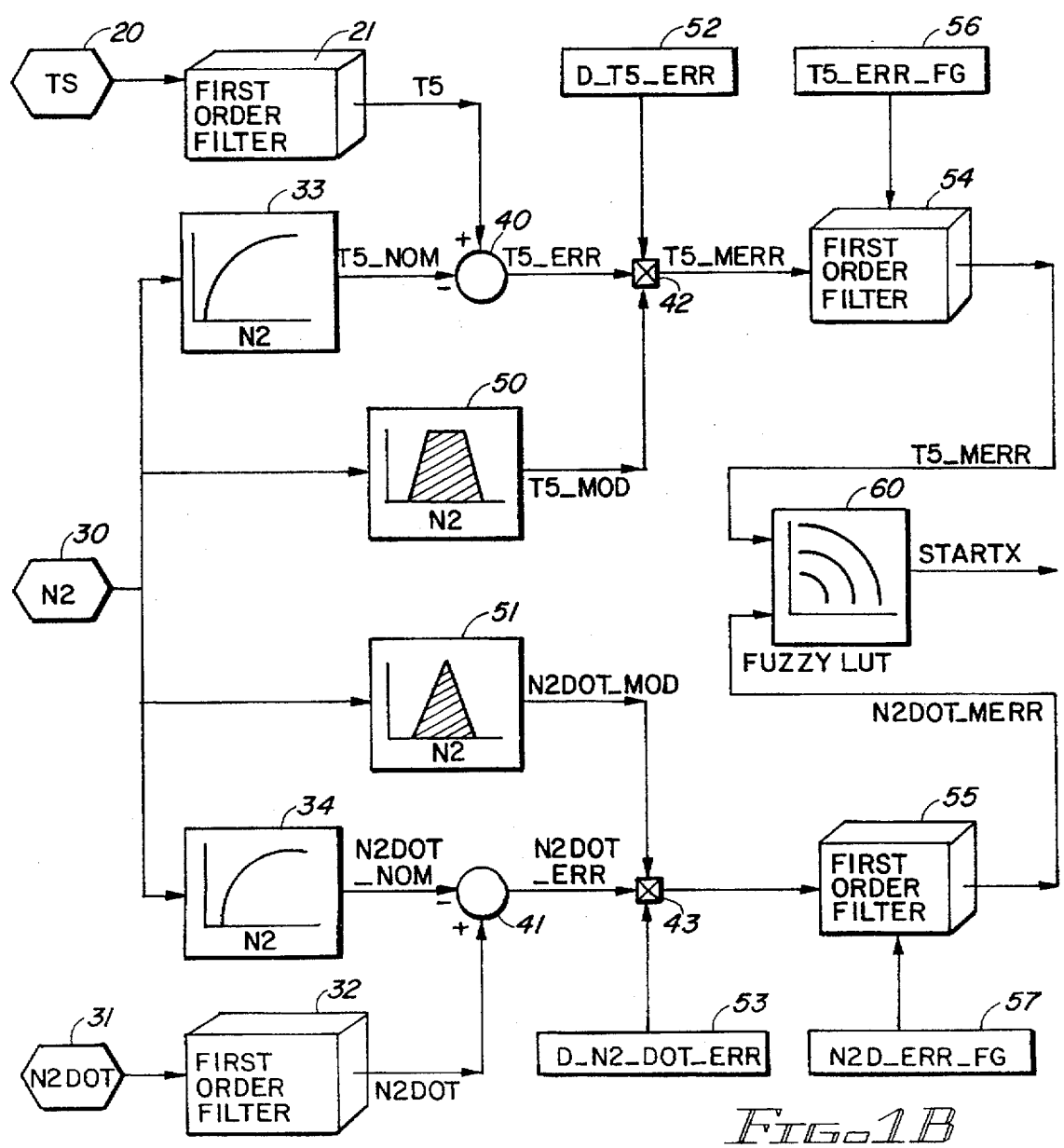
FIG. 1B is a schematic diagram of the ground start fuzzy logic control system in accordance with the preferred embodiment of this invention.

With reference to FIG. 1B, a detailed description of the control process utilizing fuzzy logic can be understood. Turbine exit temperature T5 is sensed at 20 as one of the inputs to the control system. In the preferred embodiment, temperature T5 is then filtered with a digital first order filter 21 in order to remove any noise. It should be appreciated, however, that while use of filter 21 is desirable in the preferred embodiment, it is not necessary for proper functioning of the control system in that noise is generally not a considerable problem. Filter 21 ideally utilizes a small time constant in order to prevent creating a phase lag within filtered temperature T5 value. The importance of this will be discussed in greater detail below.

Speed N2 of the engine (generally the speed of the compressor) is sensed at 30 as another input to the control system. Appropriate circuitry for determining derivative N2DOT of N2 (corresponding to the rate of change of speed) is provided at 31. As with temperature T5, N2DOT is filtered with a digital first order filter 32 in order to remove any noise. Once again, it should be appreciated that while use of filter 32 is desirable in the preferred embodiment, it is not necessary for proper functioning of the control system. Filter 32 ideally utilizes a small time constant in order to prevent creating a phase lag within the filtered N2DOT value. The importance of this will be discussed in greater detail below.

Figure 5:
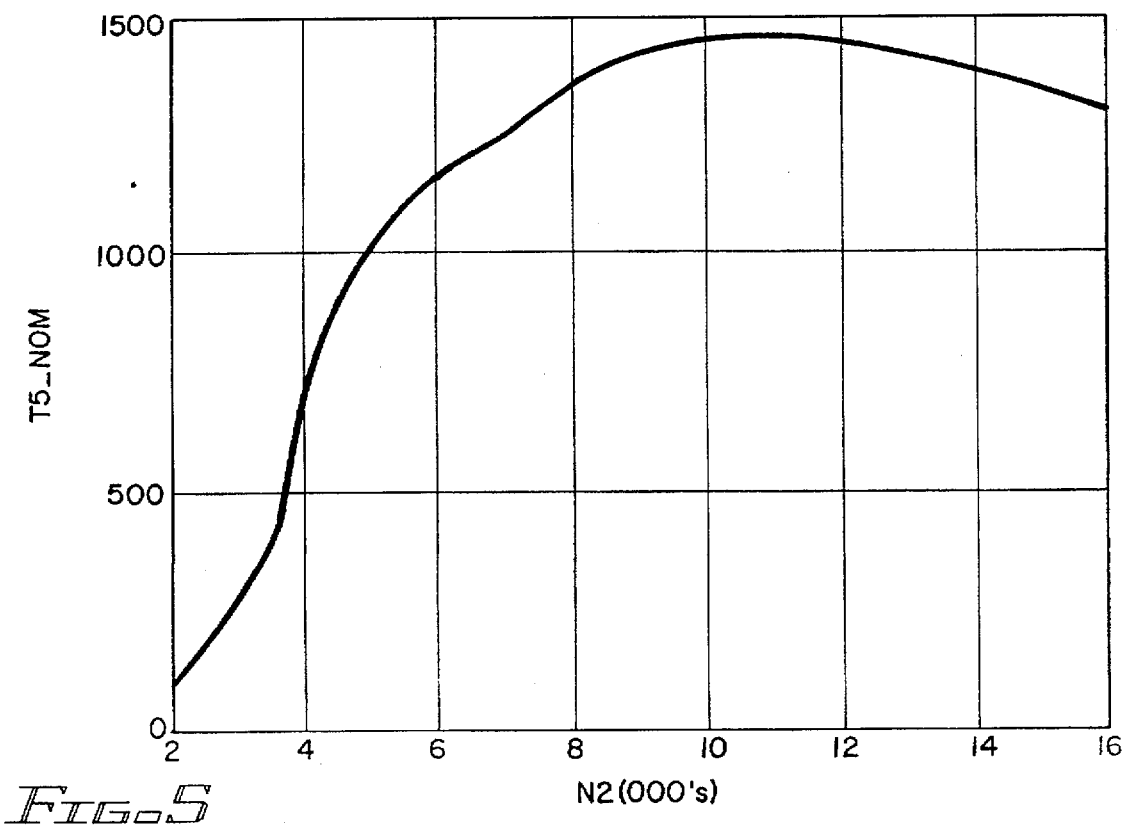
FIG. 5 illustrates the set point reference table function for exit temperature.
Figure 7:
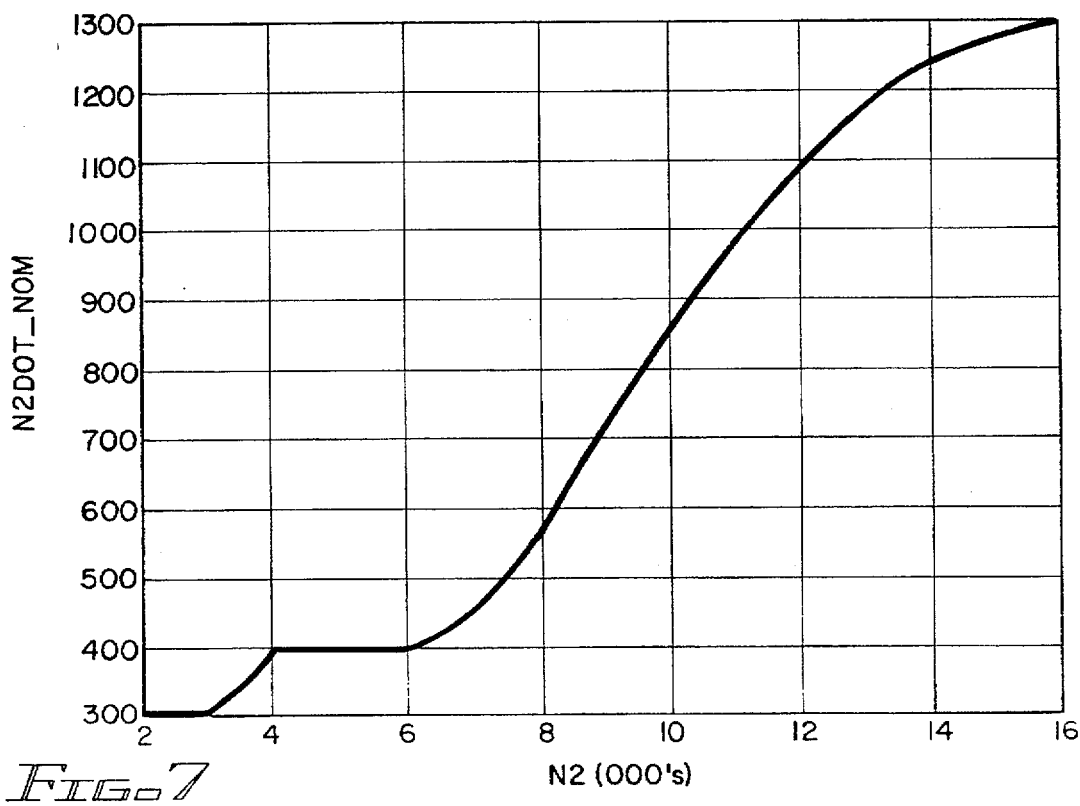

A nominal or desired value T5_NOM for temperature T5 is selected from set point reference table 33 based on sensed speed N2, while a nominal or desired value N2DOT_NOM for derivative N2DOT is selected from set point reference table 34, also based on sensed speed N2. FIGS. 5 and 7 illustrate the nominal values for temperature T5 as a function of speed and the nominal values for rate of change of speed as a function of speed, respectively.

Filtered temperature T5 is fed to a summer 40 where it is compared to or summed with nominal temperature T5_NOM start profile. This nominal start temperature T5_NOM is used as a reference to determine whether actual temperature T5 is too high or too low, and upon being fed into summer 40, creates a resulting error T5_ERR that is obtained by subtracting the nominal temperature T5_NOM value from filtered start temperature T5.

Filtered derivative N2DOT is fed to a summer 41 where it is compared to or summed with nominal derivative N2DOT_NOM start profile. This nominal speed derivative N2DOT_NOM is used as a reference to determine whether actual speed derivative N2DOT is too high or too low, and upon being fed into summer 41, creates a resulting error N2DOT_ERR that is obtained by subtracting the nominal speed derivative_NOM value from filtered speed derivative N2DOT. The importance of utilizing a filter with a small time constant can now be appreciated. If the time constant is too large, the filtered value will undergo a phase shift. Because of this phase shift, an error will be generated by the summers 40, 41 even if the filtered value and the nominal value are actually the same in magnitude. Accordingly, if filters 21, 32 are used, they should be used with small time constants.

Figure 4:
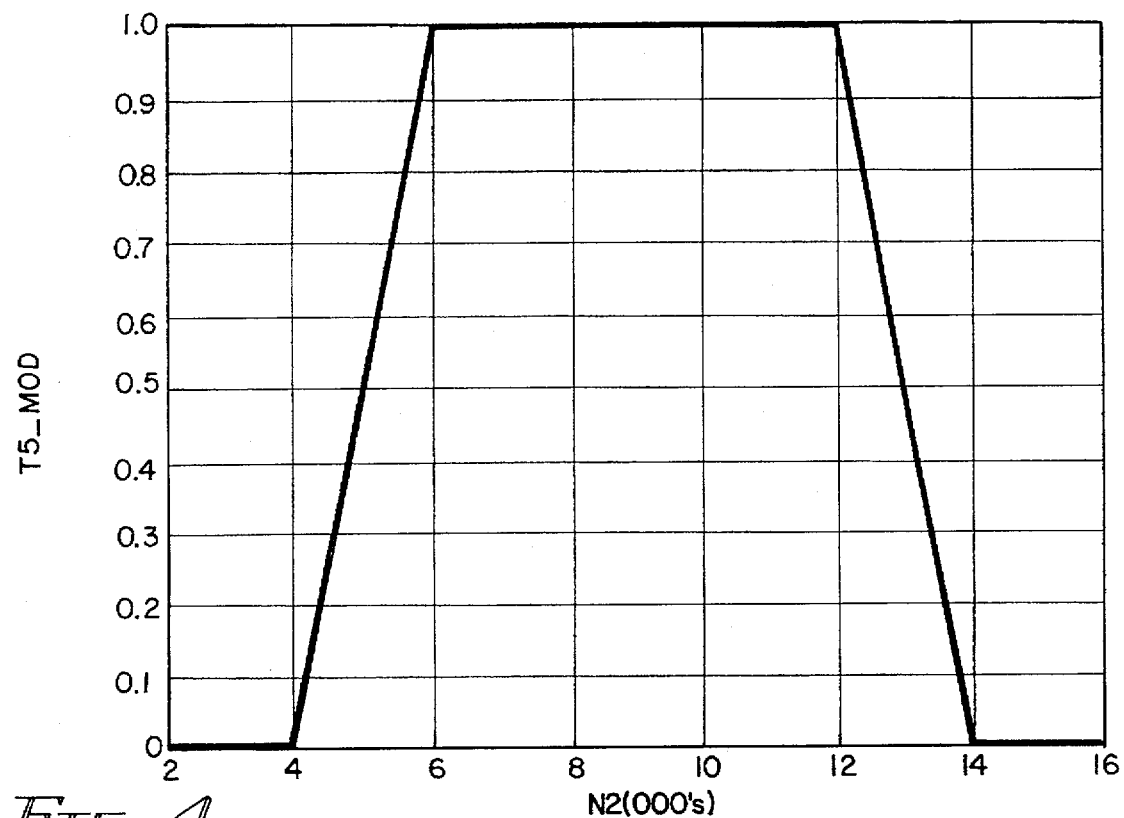
FIG. 4 illustrates the fuzzy logic transition table function graded membership for exit temperature.
Figure 6:
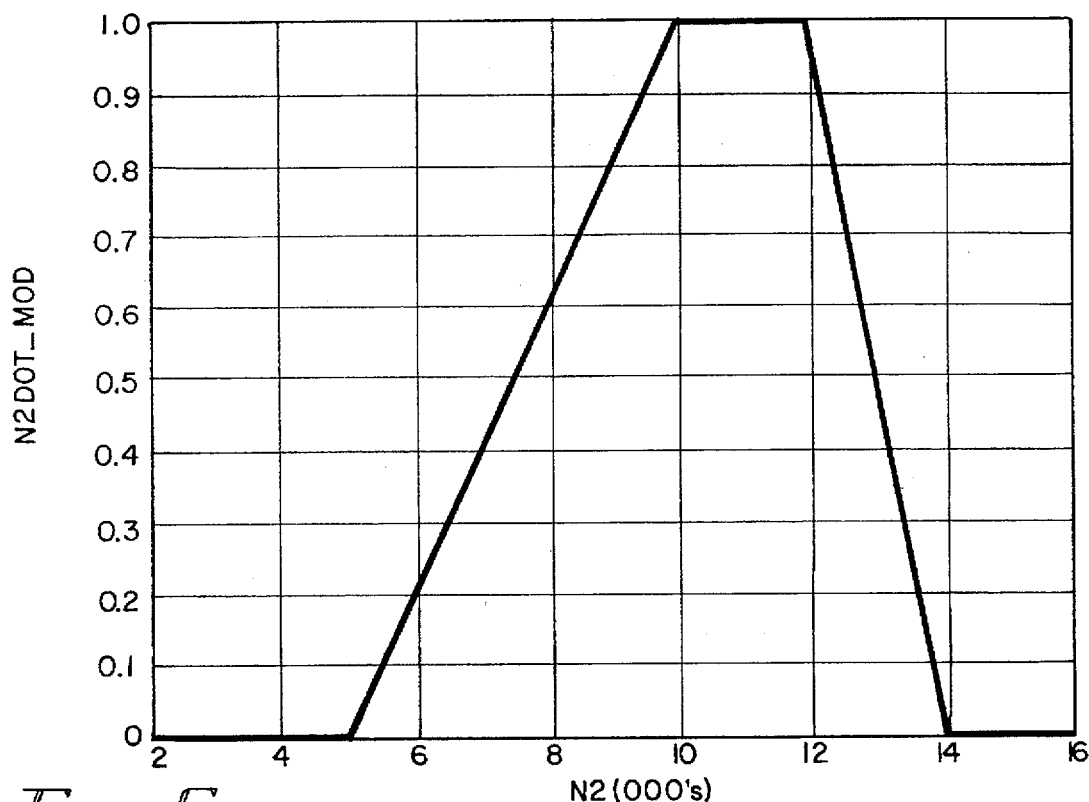
FIG. 6 illustrates the fuzzy logic transition table function graded membership for rate of change of speed; and, FIG. 7 illustrates the set point reference table function for rate of change of speed.

Error T5_ERR is now fed to multiplier 42, while derivative error N2DOT_ERR is fed to multiplier 43. Each of the errors are multiplied by respective weighting factors or modifiers T5_MOD and N2DOT_MOD, which are obtained from fuzzy logic transition look up tables 50 and 51, respectively. These values are utilized to modify error values T5_ERR and N2DOT_ERR, both tables 50, 51 are in the form of fuzzy logic membership functions. These membership functions are used to allow smooth transition from original control algorithms to new control algorithms using fuzzy logic based on engine speed N2. Both modifiers, temperature T5_MOD and rate of change of engine speed N2DOT_MOD functions, are depicted as graded memberships of speed N2 whose functions are illustrated in FIGS. 4 and 6, respectively. The actual values are also illustrated in FIG. 2. In fact, the first portion of FIG. 2 illustrates the values associated with set point reference tables 33, 34 and fuzzy logic transition look-up tables 50, 51. For example, if sensed speed N2 is 6000, then T5_NOM is selected as 1180, N2DOT is selected as 400, T5_MOD is selected as 1.00, and N2DOT_MOD is selected as 0.20.

The graded memberships are used to determine the degree of usage of temperature T5 and speed N2 to eventually control fuel flow to the engine. During low engine speed intervals, temperature T5 is more critical than rate of change of engine speed N2DOT. During medium speed intervals, both temperature T5 and rate of change of engine speed N2DOT are critical, while during high speed intervals, rate change of speed N2DOT is more critical than temperature T5. This illustrates one of the benefits of fuzzy logic and how it allows for the development of a more accurate control model. For example, during early stages of start-up, a starter within the engine creates torque and actually drives the engine. Accordingly, if the rate of change of speed is not at its desired point early during start-up, pumping in more fuel to the engine generally will not help since the starter will not be affected. This is often true when the engine has a weak starter. Likewise, at the end of the start-up phase if the rate of change of speed is too high, the fuel delivered to the engine should be lowered.

Continuing with the description of FIG. 1, disabling blocks 52 and 53 are provided for each of multipliers 42 and 43 respectively. These blocks provide for disabling their respective paths with signals D_T5_ERR and D_N2DOT_ERR respectively, thereby allowing for troubleshooting or testing to analyze effects of a single parameter within the control system.

The modified errors T5_MERR and N2DOT_MERR are than filtered in respective first order filters 54 and 55 with respective gains 56 and 57. This filtering function is done more as a cosmetic function, rather than out of necessity, to "smooth" the error signals because stability of the overall control system is not a problem. Accordingly, it should be appreciated that while use of filters 54, 55 is desirable in the preferred embodiment, it is not necessary for proper functioning of the control system. One distinct disadvantage of using filters 54, 55 is that they slow down the response of the control system.

The filtered modified error signals are then fed to a fuzzy logic fuel adjustment table 60. Based on the modified errors, a fuel adjustment factor STARTX is selected and then multiplied by a multiplier to create a fuel flow command that is fed to fuel flow controller 13. The second portion of FIG. 2 illustrates the values for the fuel adjustment factor based on the modified errors. For example, if T5_MERR is −10 and N2DOT_MERR is 10, the fuel adjustment factor STARTX selected is 0.976. The fuzzy logic rules utilized to develop table 60 are discussed below.

To continue with the benefits of fuzzy logic, a basic description of fuzzy logic control is briefly provided. Fuzzy logic sets the ability to express the amount of ambiguity in human thinking and subjectivity. Fuzzy logic expresses continuous logic and it recognizes the statements of degrees of truth in them as graded expressions, rather than true or false expressions. Input data are "fuzzified" by plugging them into membership functions. The shape and locations of the membership functions determine how well the fuzzy logic operates. The processing stage in a fuzzy logic system is based on a collection of rules. This fuzzy knowledge base consists of rules as IF . . . THEN statements. In effect, fuzzy rules link input truth values to output fuzzy variables. An inference methodology is used to solve the rules to find a conclusion. The outputs from the rules form a composite fuzzy set. This fuzzy set is converted or "defuzzified" to a real number using a centroid method. In a centroid method, a center mass for the composite fuzzy sets becomes the final output value.

In contrast, with a conventional control method, the "absolute" values are utilized. With this type of control method, a problem arises when the values obtained are in conflict, i.e. the parameters dictate that fuel flow should be increased and decreased at the same time. Conventional control methods do not allow for determining which of the conflicting parameters should prevail. However, fuzzy logic, with its weighting factors and grading memberships does rectify conflicting parameters.

Rules utilized for developing fuzzy logic fuel adjustment table 60 are as follows:

Rule #1: If T5_MERR is Negative and N2DOT_MERR is Negative THEN Fuel Flow is LargePositive. This is an indication of low fuel flow as a result of sensor or fuel delivery device inaccuracies. This rule opens the fuel flow controller to the maximum thus correcting low readings of both temperature and speed acceleration.

Rule #2: If T5_MERR is Negative and N2DOT_MERR is NearZero THEN Fuel Flow is Positive. The engine is cold and the acceleration is close to normal. As the engine is cold, a small amount of fuel has to be added to increase the temperature.

Rule #3: If T5_MERR is Negative and N2DOT_MERR is Positive THEN Fuel Flow is Negative. The engine is cold and acceleration is very high. In order to keep start time consistent, it is required to slow down the engine speed by reducing the fuel flow.

Rule #4: If T5_MERR is NearZero and N2DOT_MERR is Negative THEN Fuel Flow is NearZero. The temperature is near nominal and the engine is running slow. Since temperature is more critical then speed, and because the temperature is nominal, and even though the speed is low, this rule dictates that there is no need to increase or decrease the fuel flow.

Rule #5: If T5_MERR is NearZero and N2DOT_MERR is NearZero THEN Fuel Flow is NearZero. Both the temperature and speed are normal and this rule dictates that there is no need to increase or decrease the fuel flow.

Rule #6: If T5_MERR is NearZero and N2DOT_MERR is Positive THEN Fuel Flow is Negative. The temperature is nominal and the acceleration of the engine is high. In order to keep the start time consistent, fuel flow has to be reduced. This is a scenario of stronger than normal start torque.

Rule #7: If T5_MERR is Positive and N2DOT_MERR is Negative THEN Fuel Flow is Negative. This is a scenario of weak starter torque. In order to keep start time consistent and because temperature is more critical than speed, reduce fuel flow because the temperature is high.

Rule #8: If T5_MERR is Positive and N2DOT_MERR is NearZero THEN Fuel Flow is Negative. The engine is hot and the acceleration is normal. The fuel flow should be reduced in order to bring down the temperature.

Rule #9: If T5_MERR is Positive and N2DOT_MERR is Positive THEN Fuel Flow is LargeNegative. Fuel flow is excessive since both engine temperature and engine acceleration are above normal. Therefore, fuel flow has to be reduced.

Figure 3:
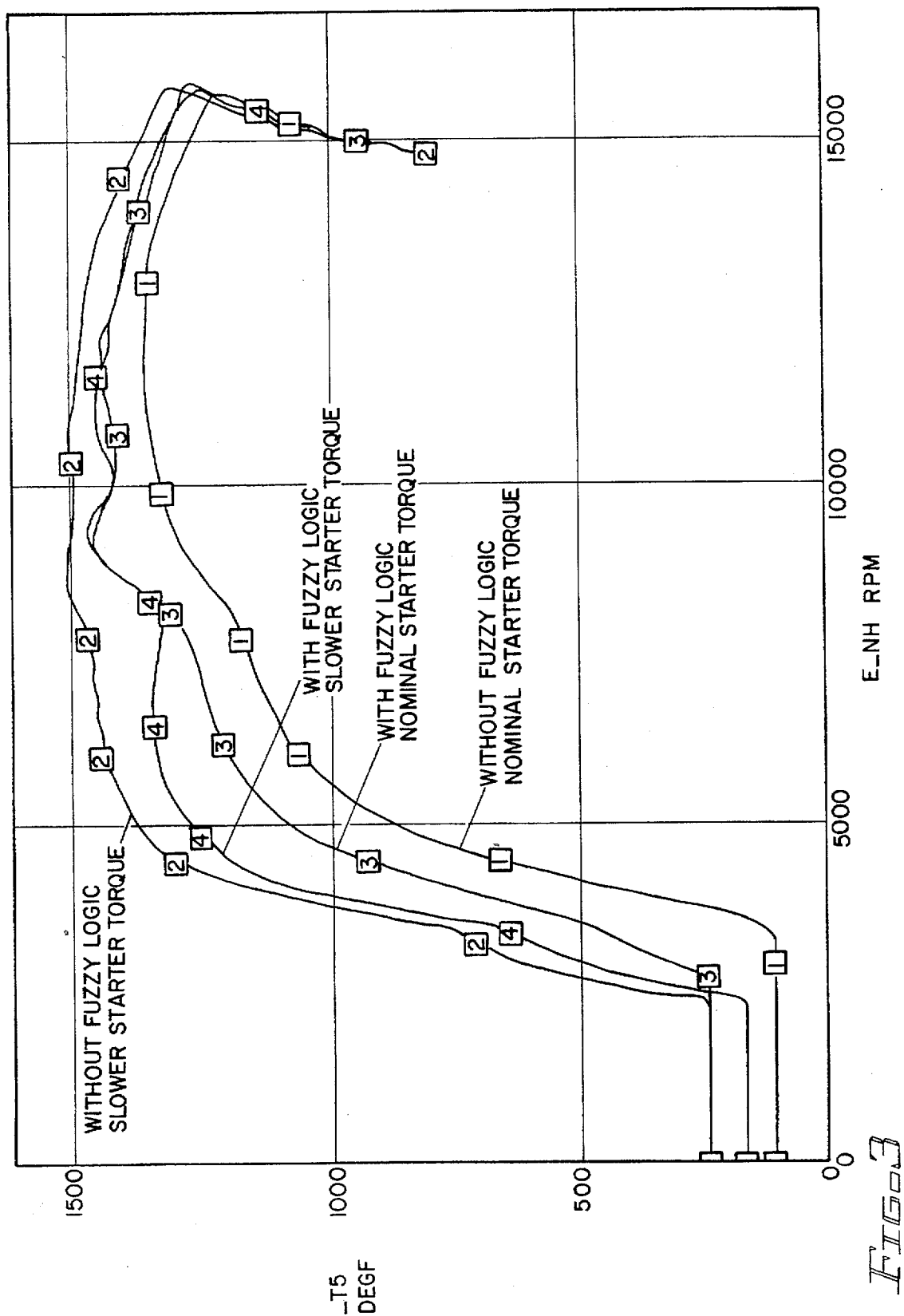
FIG. 3 illustrates a summary of results of actual tests of turbine engine start-up utilizing a conventional control system and a control system utilizing fuzzy logic in accordance with the present invention.

FIG. 3 illustrates a summary of results of actual engine tests with and without the new Ground Start Fuzzy Logic Control. The tests were also conducted with varying starter torques. The spread of the start time for all actual engine tests that were conducted was approximately three seconds when utilizing the Ground Start Fuzzy Logic Control, while the spread of the start time when the Ground Start Fuzzy Logic Control was not utilized was approximately six seconds. The spread of maximum temperature T5 reached for all actual engine tests was approximately 144° F. with the Ground Start Fuzzy Logic Control and 366° F. without the Ground Start Logic Control. The maximum temperature T5 reached during the entire test was 1494° F. with the Ground Start Logic Control and 1523° F. without the Ground Start Logic Control. The maximum temperature T5 is limited by a T5 topping governor and accordingly, probably would have been even higher during the tests of engines without the Ground Start Logic Control. These results illustrate the advantages of utilizing a control system designed with fuzzy logic in accordance with the present invention.

Thus, the invention contemplates a method for controlling fuel flow to a gas turbine engine during start-up comprising the steps of: sensing at least two engine operating parameters f1 and f2; comparing sensed parameters f1 and f2 to preselected desired values of parameters f1 and f2 to create f1 and f2 error signals; modifying the f1 and f2 error signals by preselected fuzzy logic rules; and generating a control output signal in accordance with the modified f1 and f2 error signals to control fuel flow to the engine.

It will be understood that the foregoing description is of the preferred exemplary embodiment of the invention, and that the invention is not limited to the specific forms shown. Various modifications may be made in the design and arrangement of the elements set forth herein without departing from the scope of the invention as expressed in the appended claims.

We claim:

1. A method of controlling start-up of a turbine engine including a compressor and a fuel control system comprising the steps of:

selecting desired start-up characteristics;

sensing a first parameter associated with said start-up;

sensing a second parameter associated with said start-up;

comparing said parameters with said desired start-up characteristics and determining a first error and a second error;

determining a first graded membership from a first fuzzy logic look-up table based on said first error;

determining a second graded membership from a second fuzzy logic look-up table based on said second error;

determining an output compensation factor from a third fuzzy logic look-up table based on said graded memberships; and, adjusting said fuel control system based on said output compensation factor.

2. The method of claim 1 wherein said step of sensing a first parameter comprises sensing an exit temperature associated with said engine.

3. The method of claim 2 wherein said step of sensing a second parameter comprises sensing a rate of change of speed of said compressor.

4. The method of claim 3 further comprising the step of filtering said parameters after sensing said parameters.

5. A method of adjusting a fuel control system during start-up of a turbine engine including a compressor, said method comprising the steps of:

sensing an exit temperature associated with said engine and a speed associated with said compressor;

comparing said sensed temperature and a rate of change of said speed with desired start-up characteristics to create temperature error value and a acceleration error value;

wherein, if said temperature error value is negative and said acceleration error value is negative, then said fuel flow control system opens fuel flow to said engine to a maximum;

if said temperature error value is negative and said acceleration error value is near zero, then fuel flow to said engine is increased by said fuel control system;

if said temperature error value is negative and said acceleration error value is positive, then fuel flow to said engine is reduced by said fuel control system;

if said temperature error value is near zero and said acceleration error value is negative, then fuel flow is neither increased nor decreased by said fuel control system;

if said temperature error value is near zero and said acceleration error value is near zero, then fuel flow is neither increased nor decreased by said fuel control system;

if said temperature error value is near zero and said acceleration error value is positive, then fuel flow to said engine is reduced by said fuel flow control system;

if said temperature error value is positive and said acceleration error value is negative, then fuel flow to said engine is reduced by said fuel flow control system;

if said temperature error value is positive and said acceleration error value is near zero, then fuel flow to said engine is reduced by said fuel control system; and, if said temperature error value is positive and said acceleration error value is positive, then fuel flow to said engine is reduced by said fuel control system.

* * * * *